United States Patent Office

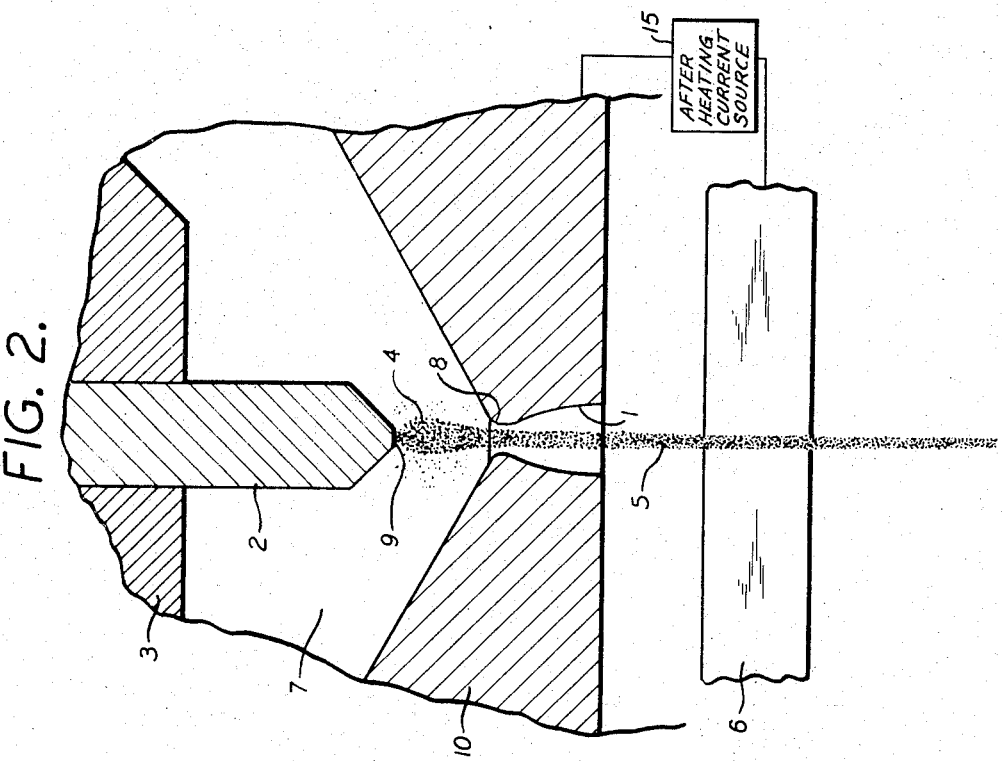
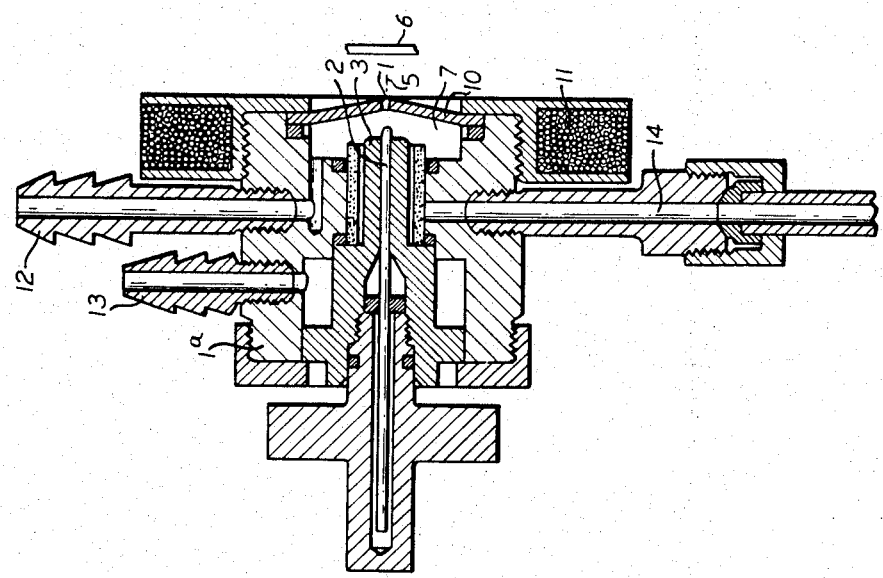

3,370,148
Patented Feb. 20, 1968

3,370,148
ELECTRIC-ARC PLASMA-FINE-SPRAY BURNER
Manfred von Ardenne, Dresden-Weisser Hirsch, Germany, assignor to Firma Kjellberg, Elektroden & Maschinen G.m.b.H. IN. Verwaltung, Finsterwalde, Germany, a corporation of Germany
Continuation-in-part of application Ser. No. 249,076, Jan. 2, 1963. This application June 29, 1965, Ser. No. 468,055
12 Claims. (Cl. 219—75)

ABSTRACT OF THE DISCLOSURE

An electric-arc plasma-fine-jet burner for cutting and welding metallic work-pieces comprising a burner body having a recess and an elongated cathode secured in the recess of the burner body and having a limited emitting surface at its end facing outwardly from the burner body. The burner body defines a discharge chamber in the recess surrounding the cathode, and a burner nozzle opening is formed in a nozzle portion of the burner body spaced apart from and substantially coaxial with the cathode, and has an entrance and exit opening for a plasma spray originating at the emitting surface of the cathode and adapted to flow toward a work-piece disposed in front of the exit opening. Means are provided for applying a high pressure gas charge in the discharge chamber. The diameter of the burner nozzle is about 0.65 to 1.2 millimeters, and the ratio of the gap width of the burner nozzle corresponds to 1:5 to 1:1.5 with respect to the distance of the emitting surface of the entrance opening. The operating pressure of the gas charge is within the range of 30 to 100 atm. Either the nozzle portion or the work-piece is adapted to function as an anode whereby a fine, nearly parallel plasma stream is propelled toward the anode, the stream having a speed of about 3 to 4 Mach., and a length corresponding to about 25 to 30 times the diameter of the burner nozzle.

---

This is a continuation-in-part application to application, Ser. No. 249,076, filed Jan. 2, 1963, now abandoned.

The present invention relates to an electric-arc plasma-fine-spray burner in general and to an electric-arc-plasma-fine-spray burner, which permits for the first time to perform micro-sections and pointed heatings, in particular.

In the known electric-arc-plasma burners, the electric arc burns in the manner of operation with an indirect high current-electric arc after striking the arc between a rod-shaped cathode of a diameter of several millimeters, for instance, of tungsten, and the water-cooled walls of the narrowed nozzle of copper as the anode. The axial gas stream drives the plasma, of a striking discharge produced at the start, into the actual discharge chamber and strikes the current-strong arc discharge.

The created high-current electric arc is narrowed down additionally by the gas stream in the nozzle. The gas stream on the nozzle wall prevents an early and point-shaped start of the arc on the inner wall of the nozzle, operating as the anode, whereby the heat energy converted during the discharge is extensively transmitted to the arc-gas. The conversion of the electric energy into heat energy is based on the fact that the highly ionized discharge plasma becomes an electronic conductor which is heated up by the Joule effect, as in metals, and transmits the heat energy to its surroundings.

In the operation with so-called direct electric arcs, the nozzle electrode does not serve anymore as the anode, rather the metallic work piece itself operates as such anode. In this case, a particularly great proportion of the electric output extended for the electric arc is useable for the work piece heating.

The flame produced in the known electric-arc-plasma-burner has the drawback that it has a relatively large cross-section. Accordingly, the separating widths are appreciably great, namely 4–10 millimeters, upon putting into operation the normal plasma-burner. It was not possible until now to construct a plasma-burner, which makes it possible to produce piercing flames of an extremely small cross-section and, thereby, to obtain also narrow spacing widths. Due to the great flame cross-sections in the conventional plasma-burners, in addition the marginal zones of the separation space, of a width of several millimeters, are thermally highly charged and changed. Due to overheating of the marginal zones, a separation of the alloy ingredients takes place. Furthermore, hardness cracks are formed, the brittleness of the material is increased and a separation of thin-walled parts is completely illusory since the material warps. It would be necessary, in order to avoid these drawbacks, to reduce the flame cross-section in the conventional electri-arc-plasma-burner in such manner that the nozzle diameter is properly reduced. It appears, however, that the arc discharge assumes an improper condition or becomes completely extinct. This condition must be characterized as a consequence of the extremely high plasma-wall losses within the space of the critically narrowed nozzle.

It is one object of the present invention to provide an electric-arc-plasma-fine-spray-burner, the piercing flame of which has an extremely small cross-section, and which avoids to a great extent the above-stated drawbacks of the known plasma-burners, as the great width of the separating space and of thermal disturbing zone. This object pertains not only to the structure of the burner, but also to the change of the discharge principle.

It is another object of the present invention to provide an electric-arc-plasma-fine-spray-burner, wherein the cross-section of the burner nozzle opening is extremely small and the highest pressure electric arc burns directly at the entrance opening of the micro nozzle. The burner nozzle can then be constructed as a Laval nozzle, it can be of cylindrical shape, but can have also any other cross-section in a plane perpendicular to the burner axis. The diameter of the burner nozzle should be less than 1 mm.; it may, however, have values ranging from 0.65 to 1.2 mm.

The highest pressure electric arc is produced with a volume of one or a few mm.$^3$ with a tungsten fine-pin-cathode. The distance of the emitting end face of the nozzle entrance opening should be only one or a few mm. The fine-pin-cathode projects suitably from a cooled, centered cathode carrier for a length which amounts to one to ten times of the diameter of the contact pin. The result of such measurement is a very high specific energy denseness of the cathode ranging upward from a surprisingly high value of 1.9 x 10$^6$ w/cm.$^2$, and, thereby, greatest reduction of the arc volume. Due to the high pressure of 30 to 100 atm. applied in the discharge chamber and the fineness of the nozzle, the high-temperature plasma emerges as a fine, fast, parallel stream from the nozzle, and has a speed greater than sound of 3 to 4 Mach. The temperature of the plasma-fine-spray reaches approximately 16,000° K. The concentration of the plasma-spray according to the present invention is set so that a very low cross-sectional area of the spray be combined with a very high energy or output density, expressed in watts/cm.$^2$, resulting in a surprisingly low power requirement of up to about only 20 kw.

It is also possible to apply a plurality of micro-burner nozzles for particular purposes. The geometrical configuration of the emitting end faces of the respective pin-cathodes must be complemented to the geometrical configuration of this multiple nozzle. Either the nozzle electrode or the metallic work piece to be treated can be connected as the anode. An additional electric source having a falling characteristic between the burner body forming a nozzle electrode and the work piece can cause in particular cases an after-heating of the plasma-fine-stream upon emerging from the nozzle.

It is also possible to cause rotation of the highest pressure electric arc on the nozzle side by means of an axial magnetic field created by a coil surrounding the nozzle electrode, in order to avoid a melting of the nozzle even at very high currents.

It is yet another object of the present invention to provide an electric arc-plasma-fine-spray-burner wherein the latter is fed from a pulse-emitting electric source controlled by a predetermined program, in order to make possible a spot heating of work pieces.

It is still another object of the present invention to provide an electric-arc-plasma-fine-spray-burner, wherein said burner includes means for a controlled advance movement thereof and means for coupling with a pantograph device, in order to be extremely suitable for cutting of profiles.

With these and other objects in view, which will become apparent in the following detailed description, the present invention will be clearly understood in connection with the accompanying drawings, in which:

FIGURE 1 is an axial section of an electric-arc-plasma-fine-spray burner designed in accordance with the present invention; and FIG. 2 is a section of the burner nozzle and of the discharge chamber, shown on an enlarged scale.

Referring now to the drawings, and in particular to FIG. 1, a burner nozzle 1 is designed as a Laval nozzle and has a diameter of 0.65 to 1.2 millimeters, preferably 0.65 mm. when a separate anode is used, and 1.2 mm. when the work piece itself is connected as an anode. Practical experiments in the actual use of plasma-burner embodiments proved that the admissible range of nozzle diameters may be even larger, e.g., 0.02 to 1.2 millimeters. An emitting face 9 (FIG. 2) of a tungsten pin-cathode 2, which is thorium-coated, is disposed spaced apart one or a few millimeters from the burner nozzle 1, and the tungsten pin-cathode 2 is fitted into a water-cooled cathode carrier 3. Preferably the fine pin-cathode projects from said carrier for a length corresponding to one to ten times the diameter of the cathode 2. The centering of the tungsten-pin-cathode 2 relative to the burner nozzle 1 must be extremely accurate. A dense high temperature plasma 4 is produced between the tungsten pin-cathode 2 and a nozzle entrance opening 8 with an extremely small volume of one or a few mm.$^3$. A fine stream 5 emerges from the burner nozzle 1 towards a work piece 6 to be treated. A water-cooled copper anode 10 is also provided, as shown in FIGS. 1 and 2. A coil 11 is disposed at the level of a dischanrge chamber 7 for the production of an axial magnetic field. In order to bring about the cooling effect, feeding and discharge branches 12 and 13 are secured to the main body 1$^a$ of the burner. The main body 1$^a$ is also equipped with a feeding conduit 14 for the electric-arc gas.

For best results, the invention contemplates the provision of an annular nozzle gap width having a ratio of 1:5 to 1:1.5 with respect to the distance of the cathode emitting face 9 from the nozzle entrance opening 8.

In the electric-arc-plasma-fine-spray-burner, depending upon the type of treatment, the work piece 6 or the nozzle electrode 10 operates as an anode in the discharge. If the circuit includes a path from the cathode 2 to the anode 10 (called "nozzle-pole mode"), the maximum diameter of the nozzle 1 should be max. 0.65 mm.; when the work piece 6 itself is connected as an anode ("work-pole mode, direct electric arc"), the diameter may be up to 1.2 mm. The dense plasma 4 of a highest pressure discharge, rich in energy, which plasma 4 has a very small volume only by different measures, is disposed directly in front of the fine burner nozzle 1.

The measures reducing the volume and increasing the density of the plasma reside, preferably, in the selection of a very small distance, for instance 1 mm., between the bottom of the cathode 2 and the entrance of the nozzle 1, and in the use of a tungsten-pin-cathode 2 with a small pin diameter of about 1 mm.

Due to the high pressure applied in the discharge chamber 7, namely a pressure of about 30 to 100 atm., and the small size of the burner nozzle 1, the high-temperature plasma emerges from the burner nozzle 1 with a speed greater than sound (about 3 to 4 Mach.) as a fine, nearly parallel stream 5. Within the range of the flame, close to the nozzle, the diameter of the flame amounts to only about 0.5 to 0.6 of the nozzle diameter. It is for this reason advisable to move the work piece for finest treatments as close as possible to the nozzle exit opening. The possible length of the plasma point flame 5 has a value of about 25 to 50 times of the diameter of the burner nozzle 1.

Due to the small size of the nozzle diameter, the gas consumption remain within economically permissible limits in spite of the high pressure used.

For the point heating of work pieces, as semi-conductors, etc., the electric source of the plasma burner is adjusted for pulse feeding of the electric arc by conventional means.

For a nozzle diameter of up to about 1.2 mm., the power requirement for the plasma-fine-spray-burner lies between 0.2 to 20 kw.

It is possible to create an axial magnetic field with the coil 11 (the strength being at about 100 to 2,000 oersted). It is particularly economical to bring about this magnetic field in such manner that the winding of the coil 7 is connected to the circuit of the generator.

An electric-arc gas can be used, for instance argon, if an inert jet flame is desired. For the cutting of metals, mostly also nitrogen with hydrogen admixed thereto will suffice, whereby, due to the recombination heat, a particularly high cutting effect is brought about.

Due to the arrangement in accordance with the present invention, with a plasma-micro-jet flame, not only the separation space, but also the width of the thermally disturbed zone in the work piece is smaller for at least one to two size orders than in the known electric-arc-plasma burners. In the known plasma burners a thermally disturbed marginal zone is created along the cutting edge, which amounts to a few tenths of a millimeter to one millimeter. Yet, in the plasma burner according to the present invention this thermally disturbed marginal zone amounts to only a few hundredths (1/100) of a millimeter.

This effect of highest order opens up great perspectives for the burner cutting and treatment by means of a plasma-jet flame in connection with mechanically, electrically or photo-electrically controlled planar or spatial pantograph arrangements and copy devices, respectively. In particular, also the speed separation of thin metal sheets and other materials is also possible by means of the plasma jet flame.

An after heating current source 15 is schematically illustrated as a means including a current source connected with the burner body, constituting the anode, and the workpiece 6, for after heating the plasma spray.

While I have disclosed several embodiments of the present invention, it is to be understood that these embodiments are given by example only and not in a limiting sense, the scope of the present invention being determined by the objects and the claims.

I claim:

1. An electric-arc plasma-fine-spray burner for the cutting and welding of metallic work pieces, comprising
    a burner body having a recess,
    an elongated cathode secured in said recess of said burner body and having a limited emitting surface at its end facing outwardly from said burner body, said burner body defining a discharge chamber in said recess and surrounding said cathode, a burner nozzle opening formed in a nozzle portion of said burner body spaced apart from and substantially coaxial with said cathode, and having entrance and exit openings for a plasma spray originating at said emitting surface of said cathode and adapted to flow toward a work piece disposed in front of said exit opening, mean for applying a high-pressure gas charge in said discharge chamber, said burner nozzle opening having a diameter of about 0.65 to 1.2 millimeters, the ratio of the gap width of said burner nozzle opening corresponding to 1:15 to 1:1.5 with respect to the distance of said emitting surface from said entrance opening, the operating pressure of said gas charge being within the range of 30 to 100 atm.

said work piece and said nozzle portion constituting members, one of said members adapted to be an anode, whereby a fine, nearly parallel plasma stream is propelled toward said anode, and said stream having a speed of about 3 to 4 Mach., and a length corresponding to about 25 to 50 times of the diameter of said burner nozzle opening.

2. The burner, as set forth in claim 1, wherein said cathode forms an electric arc having a volume of at least one mm.³

3. The burner, as set forth in claim 1, wherein the distance of the emitting surface of said cathode from the entrance opening of said burner nozzle amounts to at least one millimeter.

4. The burner, as set forth in claim 1, wherein said nozzle portion is said anode, and which includes, means for cooling nozzle portion.

5. The burner, as set forth in claim 1, wherein said work piece constitutes said anode.

6. The burner, as set forth in claim 1, which includes means for after-heating said plasma spray upon emerging from said burner nozzle.

7. The burner, as set forth in claim 6, wherein said after-heating means includes a current source connected with said burner body, constituting said anode, and said work piece.

8. The burner, as set forth in claim 1, which includes means for rotating said plasma stream, in order to avoid melting of said work piece.

9. The burner, as set forth in claim 8, wherein said rotating means includes a coil at the level of said discharge chamber, for producing an axial magnetic field.

10. The burner, as set forth in claim 1, which includes means for emitting intermittent pulses for energizing said cathode, for spot heating of said work piece.

11. The burner, as set forth in claim 1, which includes means for effecting advance movement along a work piece, for cutting predetermined profiles.

12. The burner, as set forth in claim 1, wherein said cathode is pin-shaped and consists of thorium-coated tungsten, and said portion of said burner body consists substantially of copper.

References Cited

UNITED STATES PATENTS

| | | | |
|---|---|---|---|
| 3,077,108 | 12/1963 | Gage et al. | 219—75 X |
| 3,030,490 | 4/1962 | Reed | 219—75 |
| 3,102,946 | 9/1963 | Fonberg | 219—123 |
| 3,106,634 | 10/1963 | Eschenbach et al. | 219—75 |
| 3,179,783 | 4/1965 | Johnson | 219—76 |

RICHARD M. WOOD, *Primary Examiner.*